March 28, 1967 R. S. BARR 3,311,298
PORTABLE CALCULATING DEVICE
Filed Dec. 24, 1958 7 Sheets-Sheet 1
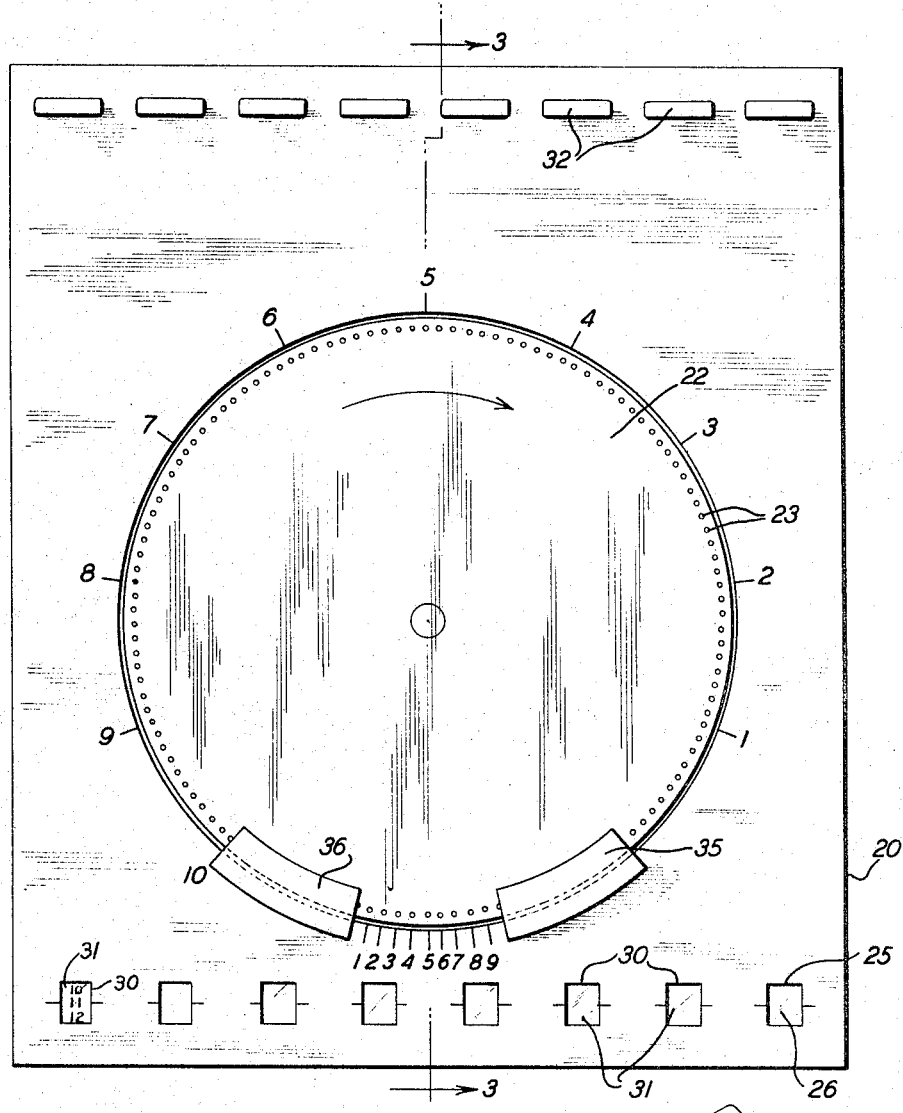
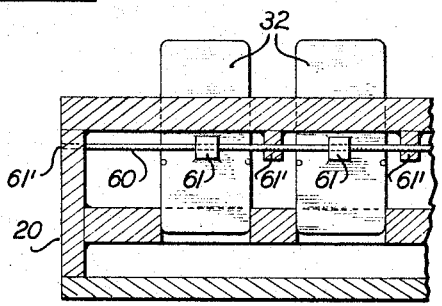
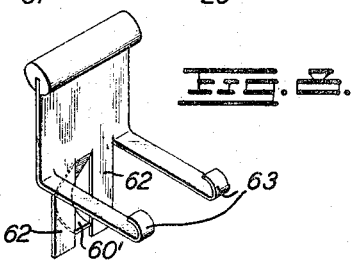
INVENTOR.
ROBERT S. BARR
BY *Paul M. Craig, Jr.*
ATTORNEY March 28, 1967 R. S. BARR 3,311,298
PORTABLE CALCULATING DEVICE
Filed Dec. 24, 1958 7 Sheets-Sheet 2
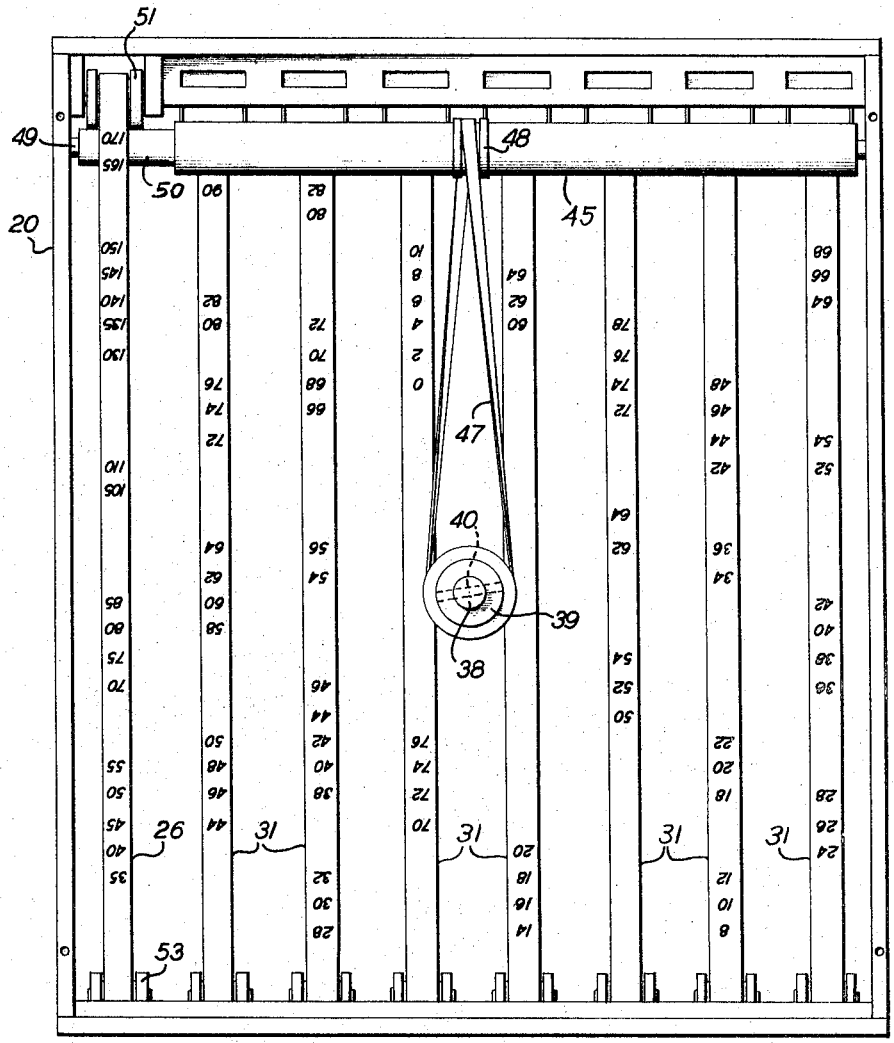
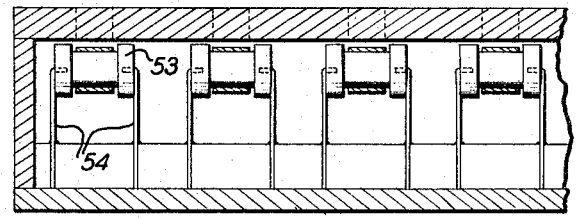
INVENTOR.
ROBERT S. BARR
BY
ATTORNEY

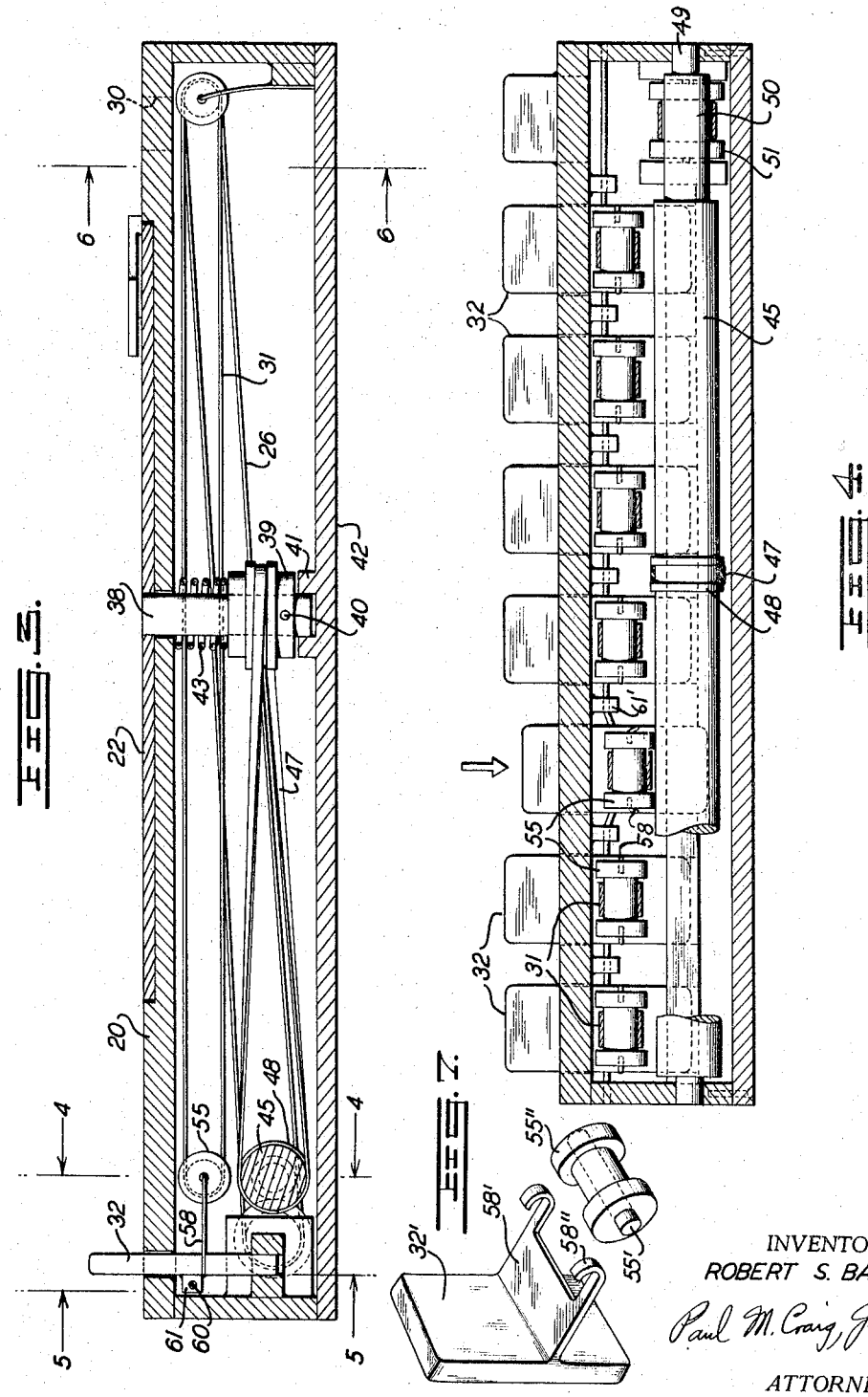

March 28, 1967
R. S. BARR
3,311,298
PORTABLE CALCULATING DEVICE
Filed Dec. 24, 1958
7 Sheets-Sheet 4
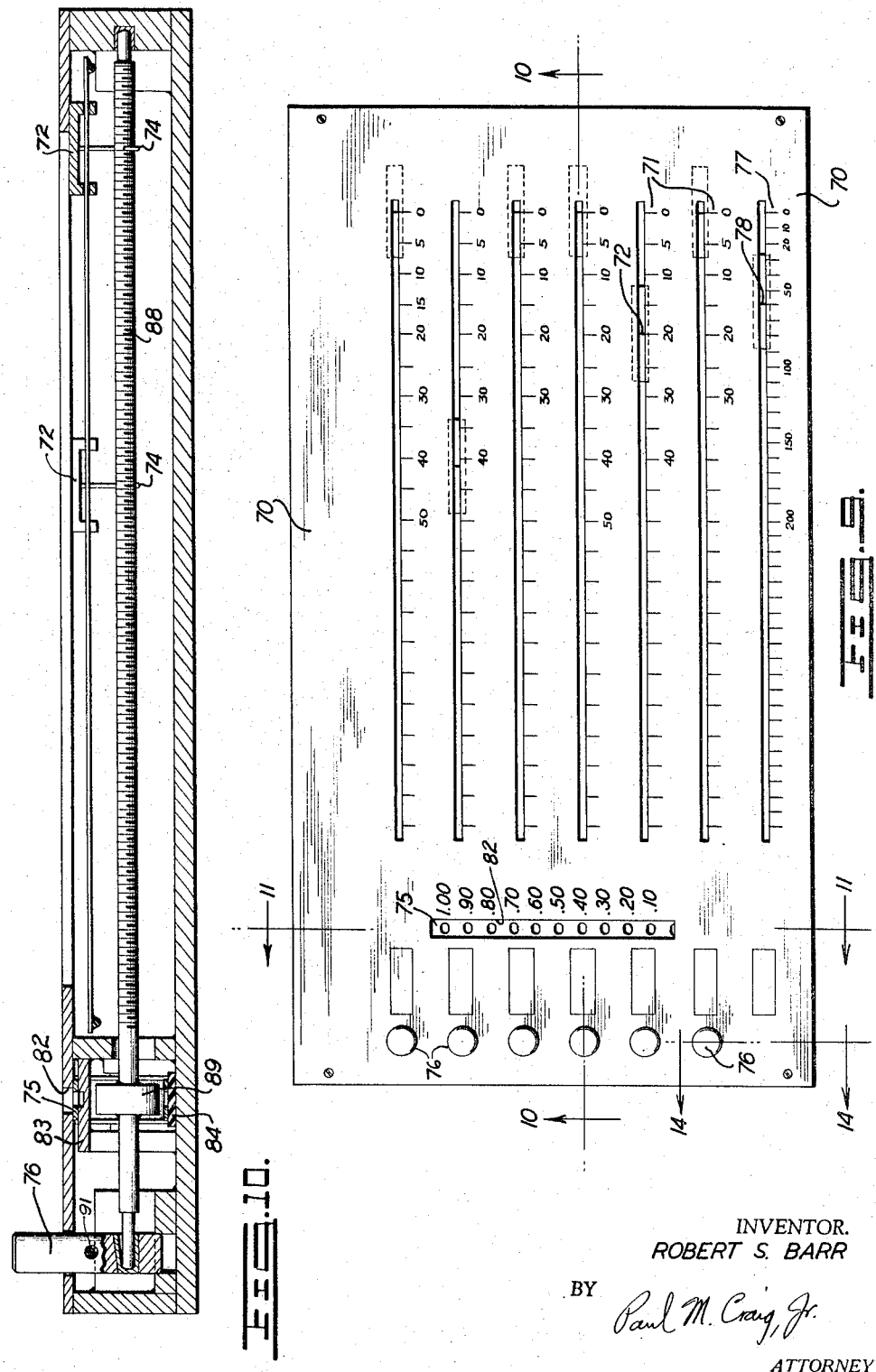
INVENTOR.
ROBERT S. BARR
BY
Paul M. Craig, Jr.
ATTORNEY

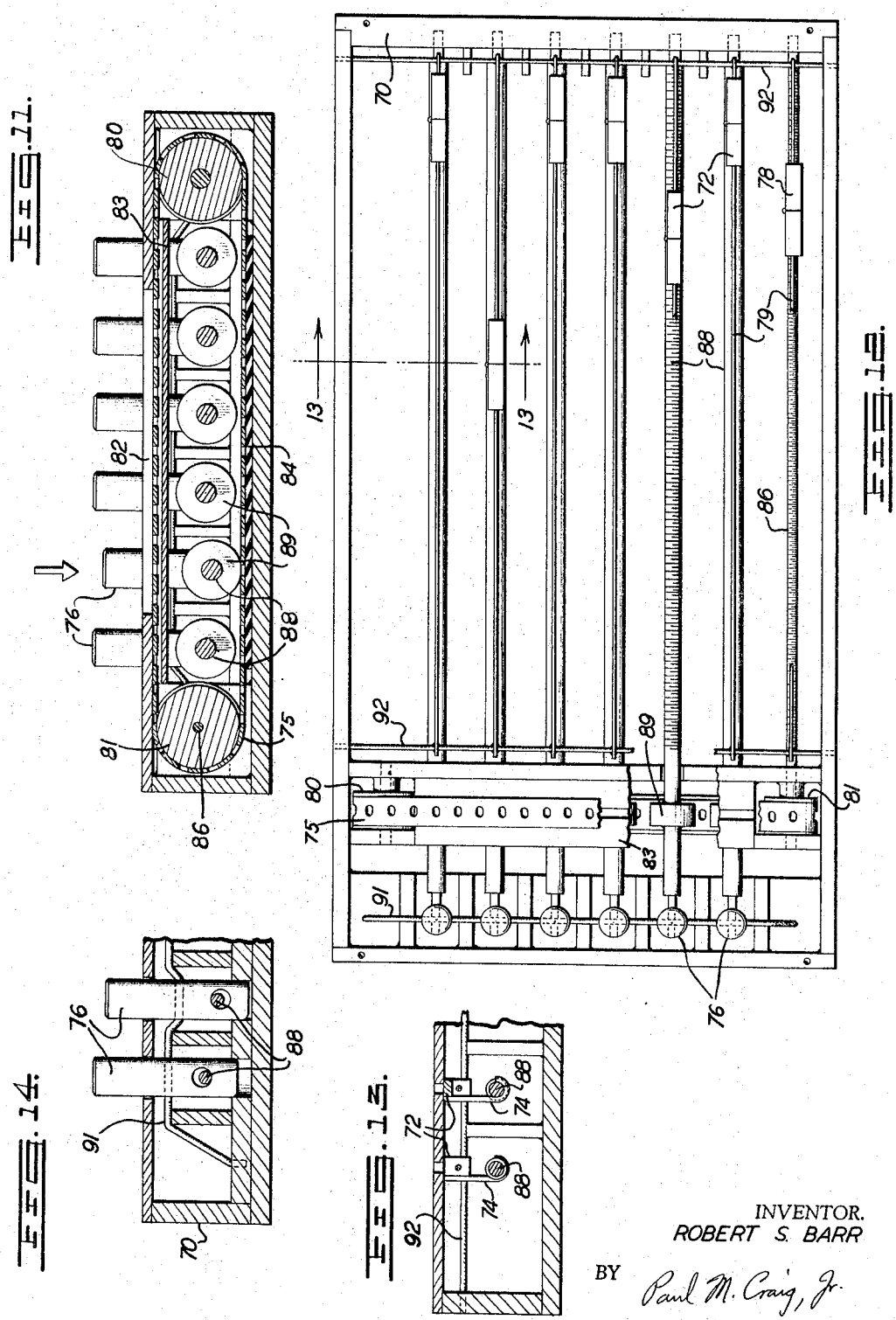

March 28, 1967  R. S. BARR  3,311,298
PORTABLE CALCULATING DEVICE
Filed Dec. 24, 1958  7 Sheets-Sheet 6

INVENTOR.
ROBERT S. BARR
BY Paul M. Craig, Jr.
ATTORNEY

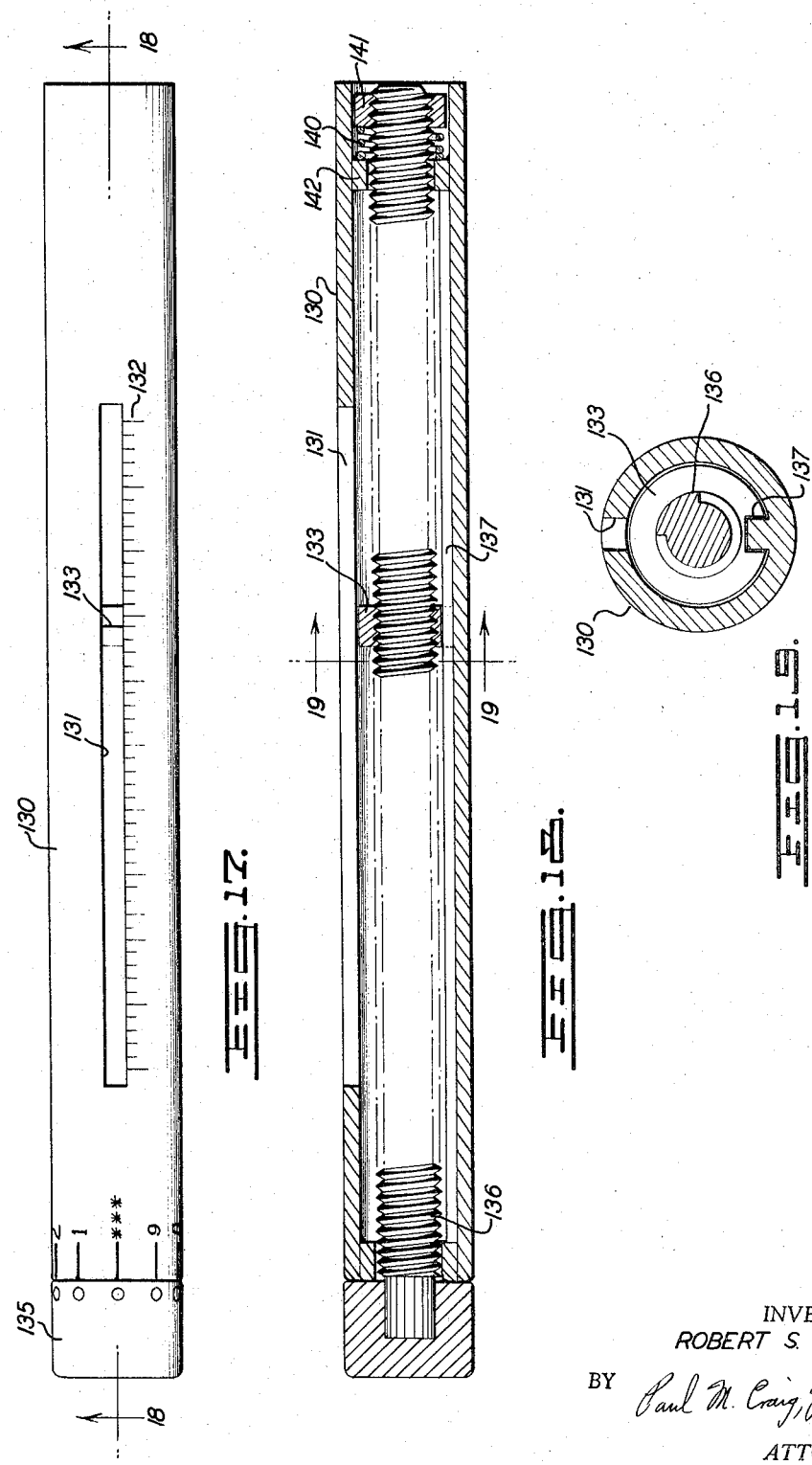

3,311,298
PORTABLE CALCULATING DEVICE
Robert S. Barr, 604 Ripley St., Alexandria, Va. 22304
Filed Dec. 24, 1958, Ser. No. 782,802
26 Claims. (Cl. 235—71)

The present invention relates to calculating devices for totalizing a plurality of amounts or quantities which are registered into the device and for making a total of all the amounts or quantities or a subtotal of selected ones thereof readily visible to the operator.

The trend in the field of calculating devices seems to be toward increased complexity and increased cost, even where the functions of such machines are for the mere addition of simple figures. The machines heretofore made available to the public have not only incorporated an extremely large number of component parts, but these parts were usually of metal and manufactured with high precision.

The expense and complexity of prior devices impede their usefulness by budget-conscious persons around the home or by record-keeping salesmen or others who wish to maintain, by some easy to use and economical means, an accurate account of total amounts of money spent, with subtotals covering particular categories, such as automobile, food, rent, clothing, personal care, and other similar categories. As will be obvious from the following description, the present invention achieves a calculator that is remarkably simple and inexpensive, and yet functions to satisfy these requirements and overcome disadvantages of the prior devices.

It is an object of this invention to provide an improved calculating device that is low in cost due both to the simplicity of its working parts and the inexpensive materials that may be used therefor.

Another object of this invention is to provide an improved calculating device that is very small so that it may be readily portable and one that is lightweight for further convenience in portability. Such reduction in size may be attained as to make the calculating device "pocket size."

Another object of this invention is to provide a compact calculator that is of sturdy construction, whose operation will not be detrimentally affected by the abuse it may receive by frequent handling by the user or the carrying of the calculator in his pocket or in the glove compartment of an automobile, for example, without a separate protective case.

A still further object of this invention is to provide an improved non-jamming and foolproof calculator which will remain trouble-free and operative, even when placed in the hands of an unskilled operator, such as a child.

According to the present invention, a calculator meeting the aforementioned objects may be constructed with a simple, rigid housing having at the exterior thereof a movable or rotatable member which is continuously displaceable in one direction for registering information, in the form of numbers or quantities, by means of a mechanism within the housing, the mechanism being provided with suitable indicia or index means for giving a visible indication of a desired total or subtotal of the registered amounts. The housing may be provided with externally-accessible, manually-actuated members which may be selectively actuated to record on one or more registering means within the housing the desired totals or subtotals.

Preferably, the registering means within the housing provides one total of all amounts registered in the calculator and the selectively actuated members each correspond to a category of amounts for which a subtotal is desired, an appropriate member being actuated each time an amount falling within a respective category is registered in the calculator.

According to a preferred embodiment of the invention, there is a disk rotatable on the housing for registering information and the mechanism within the housing comprises a plurality of tapes or belts, at least some of which are selectively displaceable to provide a record.

According to the other embodiments of the invention, a displaceable member for registering information actuates, directly or selectively, totalizing devices which may take various forms, such as screw-driven or gear-driven members which provide total or subtotal records as will be described hereinafter in detail.

These and other objects, features and advantages of the present invention will become more obvious from the following description when taken in connection with the accompanying drawings which show, for purposes of illustration only, several embodiments in accordance with the present invention and wherein:

FIGURE 1 is a plan view of a preferred embodiment of a calculator according to this invention;

FIGURE 2 is a rear view of the calculator according to FIGURE 1 with the rear cover removed, showing a plurality of recording tapes and the drive mechanism therefor;

FIGURE 3 is a section taken on line 3—3 of FIGURE 1 and illustrating the drive mechanism for recording tapes;

FIGURE 4 is a section taken on line 4—4 of FIGURE 3 and illustrating a plurality of selectively engageable clutch members for individual recording tapes;

FIGURE 5 is a partial section taken on line 5—5 of FIGURE 3 and illustrating the actuators for the selectively engageable clutches of FIGURE 4;

FIGURE 6 is a partial section taken on line 6—6 of FIGURE 3 and illustrating members for supporting and tensioning one end of the tapes shown in FIGURES 2 and 3;

FIGURE 7 is a modification of the clutch actuator used in the embodiment of FIGURES 1 through 6;

FIGURE 8 is another modification of a push button clutch actuator also useful in a calculator of the type illustrated in FIGURES 1 through 6;

FIGURE 9 is a plan view of another embodiment of the invention;

FIGURE 10 is a section taken on line 10—10 of FIGURE 9 and illustrating a screw drive for a selectively operable registering mechanism;

FIGURE 11 is a section taken on line 11—11 of FIGURE 9 and illustrating common belt drive means for actuating a plurality of selectively engageable screw driven registering mechanisms;

FIGURE 12 is a view of the device similar to that of FIGURE 9 with the front cover removed;

FIGURE 13 is a partial section taken on line 13—13 of FIGURE 12;

FIGURE 14 is a partial section taken on line 14—14 of FIGURE 9;

FIGURE 17 is a view of a still further embodiment of the invention which incorporates but a single registering mechanism;

FIGURE 18 is a longitudinal section taken on line 18—18 of FIGURE 17, and

FIGURE 19 is a transverse section taken on line 19—19 of FIGURE 18.

Figure 15:
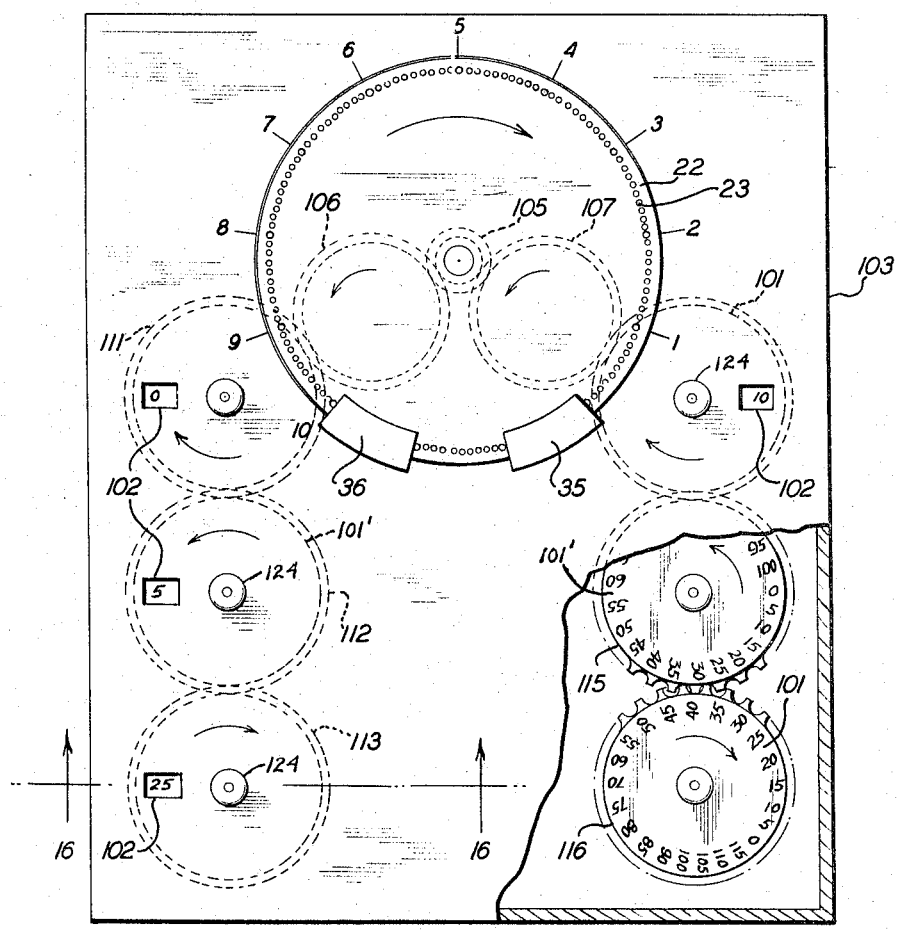
FIGURE 15 is a plan view of a further embodiment of the invention with a portion of the housing partially cut away.

Referring now to FIGURES 1 through 6 of the drawing, and particularly FIGURE 1, there is illustrated a calculator comprising a housing 20 made of strong impact-resistant material, preferably a low-cost plastic, that is provided on its front face with a rotatable disk 22 which has a plurality of exposed index marks 23 in a ring preferably near its periphery. The disk actuates a registering mechanism to be described hereinafter and may be rotated to record a predetermined amount as indicated by a scale of numbered indicia on a fixed part of the housing encircling the disk. The numbered indicia provided around the periphery of the disk 22 as illustrated, run from zero through 10, and for the household device with which the present invention is concerned, may correspond to the number of dollars to be recorded. There are at the bottom of the housing a plurality of windows through each of which a tape containing numbered indicia is visible. Through the window 25 there is viewed a tape 26 that is continuously driven by the disk 22 in a manner to be described hereinafter for providing a total of the amounts to be recorded. Through each of the other windows 30, there is viewed a tape 31 which may also be displaced by rotation of the disk 22 to record information in certain desired categories, but each of the tapes 31 is actuated only when the corresponding push button 32 is manually depressed to engage a clutch mechanism which couples the disk 22 to a tape drive means as described hereinafter. The buttons 32 each correspond to the tape located in the respective windows at the opposite end of the housing and directly therebeneath as seen in FIGURE 1.

The index marks 23 in disk 22 are preferably tool-engageable recesses whereby a stylus, for example, may be placed in any recess to rotate the disk in the direction of the arrow until further movement of the stylus is barred by its engagement with a stop 35 secured to the housing in the path of movement of the marks 23. As is evident from FIGURE 1, the disk 22 contains more index marks than is necessary for the range of $10 on the scale of the housing, but a second scale numbered from 1 through 9 and corresponding to 10 cents to 90 cents appears between a second stop 36 and the stop 35 to facilitate registering small amounts less than $1.

As seen in FIGURES 2 and 3, the disk 22 is rigidly connected to a rearwardly extending shaft 38, to which is keyed a friction drive wheel 39 by means of a pin 40 extending through the shaft and drive wheel. As an alternative, the shaft 38 may be made with the portion within the drive wheel of irregular configuration, or polygonal, to key the members together. The rear end of the shaft 38 is encircled by, and supported in, a bearing formed by a projecting ring 41 on the rear housing wall 42. The disk 22 is held in frictional engagement against the front face of the housing 20 by a spring 43 held in compression between the front wall of the housing and the drive wheel 39, the latter being kept from slipping off the shaft 38 by the pin 40.

Rotation of the disk 22 and the drive wheel 39 is transmitted to a friction drive rod 45 by means of a band 47 which encircles the drive roller 39 in a peripheral recess and extends around the rod 45 between a pair of adjacent shoulders 48 to prevent the band from moving longitudinally of the rod as the two are rotated. The band may be very slightly elastic to maintain good frictional contact with the roller 39 and rod 45, but not permitting any significant stretching that might permit movement of disk 22 without advancing the tapes. The band 47 may also be flat and perforated to engage small projections (not shown) around roller 39 and rod 45 to prevent slippage with respect thereto.

The drive rod 45 may be plastic tubing having a high coefficient of friction for a purpose to be pointed out later and supported on a central mandrel 49, the ends of which are suitably journalled in the opposite side walls of the housing 20. The plastic portion of the rod 45 has at one end a portion 50 of reduced diameter engaged by a roller 51 which supports one end of the belt 26. The roller 51 has end rims frictionally driven by the rod portion 50 and in turn frictionally drives the belt 26 encircling a central roller portion of reduced diameter. The other end of the belt 26 is carried by a second roller 53 rotatably supported by a pair of spring arms 54 projecting from an inside wall of the housing in such a manner that these arms 54 inherently bias roller 53 to keep belt 26 in tension. The arms 54 as shown in FIGURE 6 may be metal spring members or they may be plastic webs having configuration similar to that described hereinafter in connection with FIGURE 7.

Although the tapes 26 and 31 are driven in a different manner, the lower end of each, as seen in FIGURE 2, may be supported in a manner identical to that for tape 26, i.e., each tape is provided with a roller 53 and resilient support therefor to maintain the tape in tension.

Each of the tapes 31 is supported and selectively actuated in the same manner and, accordingly, the following description of construction and operation will be limited to but a single one of these tapes.

The driven end of tape 31 is carried by a central portion of reduced diameter of a drive roller 55 which is normally held in spaced relationship with respect to the friction drive rod 45 by a resiliently biased push button member 32 having a lateral resilient extension 58 carrying the roller 55. The push button 32 is supported in openings in the housing 20 for vertical sliding movement, as seen in FIGURE 3, and each button 32 is biased upwardly by a resilient cord or spring 60 engaging an abutment 61 on each button and supported at 61′ on each side of the respective abutment 61 as seen in FIGURE 5. The push button 32 may be depressed to engage the opposite tape-straddling rims of roller 55 with the upper surface of the friction drive rod 45 as illustrated for the roller beneath the large arrow in FIGURE 4. The resiliency of the lateral projection 58 on the push button 32 permits the latter to be pressed even beyond the point at which the roller 55 engages the drive rod 45 and assures that the friction drive therebetween is maintained.

The rollers 55 are preferably disposed above the rod 45, as seen in FIGURE 3, so that the rollers may be moved into and out of engagement with the rod without any significant movement of the tapes 31 lengthwise of the housing. Accordingly, there is no apparent movement of the portions of tapes 31 visible through windows 30 when push buttons 32 are actuated.

The resilient projection 58 shown in FIGURE 3 is formed by wire spring members suitably secured to the plastic push button 32. As an alternative, however, the push button may be formed, as seen in FIGURE 7, wherein the resilient projection 58′ is molded integrally with the push button 32′, the projection 58′ forming a resilient web with a bifurcated end having elements 58″ bent upon themselves to engage and retain an axle pin 55′ which supports the friction roller 55″ which is similar to roller 55.

As a still further alternative, a push button 32″ may be stamped from spring sheet metal with the configuration shown in FIGURE 8 wherein the central arm 60′ is bowed and engages at its lower end a fixed abutment to bias the push button upwardly, the latter being guided in the housing by the arms 62. The arms 63 are bent to project in the manner of the arms 58 described above and the ends of arms 63 are bent upon themselves to engage the ends of the roller axle pin 55′ as in FIGURE 7. A small plastic knob may be mounted on the outwardly projecting end of the sheet metal push button of FIGURE 8.

The rims and belt engaging portions of rollers 51 and 55 are of such size in relation to the respective portions of the friction drive rod 45 which the rims engage that belt 26 is moved at a substantially lesser rate than any of the belts 31 when the latter are selectively engaged by depressing the appropriate push button 32. Accordingly, each belt 31 may be provided with indicia along substantially its entire length to provide an indication or subtotal of amounts registered in the calculator in a particular category, whereas the belt 26 may be provided with indicia along its entire length having a maximum value approximately that of the sum of the maximum values on all of the tapes 31.

In operation, the user merely inserts a stylus in the appropriate index mark for the quantity to be recorded, presses the appropriate push button 32 and then rotates the disk 22 until the stylus engages the stop 35. This movement shifts belt 26 to increase the reading thereon at window 25 by an amount corresponding to the rotation of disk 22 and at the same time, the tape 31 at the appropriate window 30 is displaced so that the indicia thereon increases in value a like amount although the physical movement of the tape is substantially greater than that of tape 26. The amounts recorded correspond to the number of index marks moved past a given point, such as the stop 35. To record another amount in a different category, a different push button 32 is depressed and a corresponding different tape 31 is actuated, but for each recording on a different tape 31, there is still recorded a cumulative total on tape 26.

*Embodiment of FIGURES 9 through 14*

The embodiment of FIGURES 9 through 14 is similar in purpose to that above described but the mechanism is different in some respects.

FIGURE 9 shows the front of a housing 70 having a plurality of linear scales 71 and index members 72 actuated by means within the housing in response to rotational displacement of an actuating belt 75 in a manner to be described. The plurality of index members 72 are selectively actuated by belt 75 by depressing a respective push button 76 seen at the left end of the calculator. Another scale 77 is provided with an index member 78 for indicating a total of the amounts recorded on the separate scales 71.

As seen in FIGURE 12, the index members are each slidable on a guide wire 79 extending longitudinally of the housing. The index members 72 and 78 are moved along the guide wires beneath a slot or transparent opening in the front cover adjacent the scales 71 and 77 by downwardly projecting hook members 74 which engage the threads of screws driven by the belt 75. The belt is continuous and is carried by a pair of spaced supporting rollers 80 and 81 at opposite sides of the housing. The belt is perforated uniformly lengthwise and passes beneath a slot 82 in the front face of the housing so that a tool may be engaged in any one of the perforations to rotate the belt about its supporting rollers. A first portion of the belt is slidably supported between the rollers and immediately beneath the slot 82 by means of a channel member 83 fixed to the housing and supporting the belt at each side of the perforations, but permitting a tool such as a stylus to be inserted and extend beyond the lower surface of the belt and move longitudinally of the channel to displace the belt. This channel configuration is seen most clearly in FIGURE 10. The belt has a second portion exending between the rollers 80 and 81 and passing over an anti-friction layer 84 at the bottom of the housing.

The index member 78 for the totalizing scale 77 is driven by a screw 86 secured to the roller 81 for rotation therewith. The other index members 72 are driven by individual screws 88, each of which extends through the loop of the belt 75 between the rollers 80 and 81 and has a friction drive roller 89 secured thereto which may be depressed to engage the belt. The right end of each of the screws 86 and 88 as seen in FIGURES 10 and 12 is journalled by suitable means in the end of the housing 70. The other end of each of the screws 88 is suitably journalled in the push button 76 as seen best in FIGURE 10. The push buttons are biased upwardly by means of a resilient spring or cord 91, as seen in FIGURE 14, to maintain the drive wheels 89 out of engagement with the lower portion of the belt which slides on the anti-friction member 84.

The guide rods 79 for the index members are carried by transversely extending resilient spring or cord structures 92 to permit the guide wires to be displaced laterally with respect to the screws whereby the downwardly extending hook 74 of each index member may be disengaged from the screw threads to facilitate the shifting of the index member longitudinally of the housing for purposes of re-setting it to zero.

The operation of the embodiment shown in FIGURES 9 through 14 is similar to that of FIGURES 1 through 6. Each time the belt 75 is displaced downwardly, as seen in FIGURE 9, a cumulative total of the amount of displacement is indicated by the index member 78 at scale 77, but the index members 72 at each of the scales 71 are displaceable only when the appropriate push button 76 is first depressed before displacing the belt 75.

Whenever a friction roller 89 is displaced by depressing one of the push buttons 76, the drive roller squeezes the belt between it and the anti-friction surface 84 so that the belt causes the roller to rotate when the belt is displaced. The anti-friction surface 84 prevents excessive frictional resistance to displacement of the belt to prevent the application of damaging forces at the edges of the belt perforations when a tool is inserted through the slot 82 to move the belt.

Figure 16:
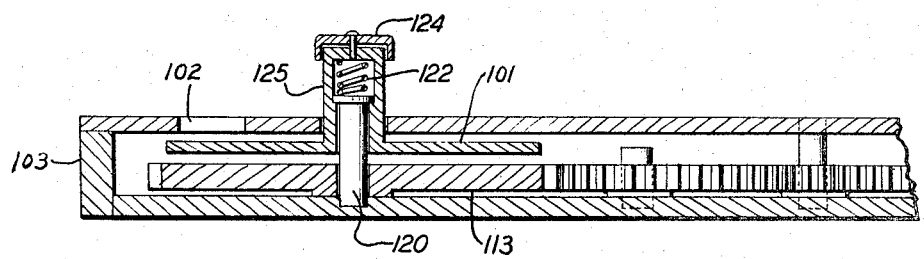
FIGURE 16 is a section taken on line 16—16 of FIGURE 15.

*Embodiment of FIGURES 15 and 16*

FIGURE 15 shows another form of calculating device which again may function to achieve the same purpose as the embodiment of FIGURES 1 through 6, but wherein the indicia for indicating totals and subtotals are printed or otherwise formed on a plurality of rotating disks 101 viewable through apertures or windows 102 in the calculator housing 103. In this embodiment, the disk 22 with index marks 23 may be identical to that seen in FIGURE 1. Similarly, the stops 35 and 36 are again used. However, in place of the belt drive of FIGURES 1 through 6, the disk is connected within the housing to a small pinion 105 which meshes with two intermediate gears 106 and 107 to drive a plurality of gears 111 through 116, of which gears 112 and 115 rotate in the same direction as gears 106 and 107, but in the direction opposite the rotation of disk 22, and all other gears rotate in the same direction as disk 22. Each of the aforementioned gears are at all times in engagement and there is disposed above at least all but one of the gears 111 through 1116 a rotatable disk 101 carrying the numbered or other indicia to be read through the windows 102. The gears 111 through 116 are each rotatably positioned by a central shaft 120 as seen in FIGURE 15 and the disks likewise are mounted for rotation about this shaft. However, the disks are also arranged to be shifted axially of the shaft 120 against the bias of a spring 122 so that the lower face of the disk may be frictionally engaged with the upper face of the respective gear for rotating the disk. Accordingly, it is possible to selectively rotate any of the disks disposed above the gears 111 through 116 in response to rotation of the main drive disk 22 by merely depressing an exposed portion 124 that projects from the front face of the housing. This portion 124 may comprise a small cap rotatably supported on a cylindrical portion 125 of the disk with a minimum amount of friction therebetween so that the disk and cylindrical portion 125 may be free to rotate with the engaged gear when the cap 124 is depressed by the user's finger.

By permanently connecting one of the disks to its respective driving gear, it can be used to provide a cumulative total of all information registered on the other disks and if desired, the last-mentioned gear for this totalizer may be one of the gears 113 or 116 at the end of the gear train arranged with a further gear reduction (not shown) to reduce the total angular rotation with respect to the other driving gears for the recording disks.

While in FIGURES 15 and 16 the teeth on the gears are shown to be rather course for purposes of illustration, these teeth may be quite fine and the gear reduction between the rotation of disk 22 and the driving gears 111 through 116 may be substantially reduced by further gear reduction in the gear chains at the points occupied by the intermediate gears 106 and 107.

To operate the embodiment shown in FIGURES 15 and 16, it is merely necessary to depress the appropriate button 124 and then rotate the disk 22 the desired amount to record a predetermined sum on the selected indicating disk, the cumulative sum of all recordings being available at a totalizing disk as indicated above.

*Embodiments of FIGURES 17 through 19*

FIGURE 17 shows a simplified totalizing device which is in some respects similar to part of that shown in FIGURES 9 through 14 but which comprises only a single indicating scale. A tubular housing 130 is provided with an elongated slot or window 131 along which is disposed a fixed uniformly marked or numbered scale 132 with an index member 133 movable in the slot or therealong to provide an indication of the amount of rotation of a rotatable knob member 135 on the end of the housing. The knob is keyed to a screw 136 extending axially of the housing 130. The index member is threaded on the screw and moves axially of the housing when the screw rotates relative thereto. The index member is prevented from rotating within the housing by means of a rib 137 extending the length of the housing and straddled by a portion of the index member. The screw is biased longitudinally of the housing by a spring 140 held in compression between a nut 141 fixed to the screw and a shoulder 142 fixed in the housing. This biasing by spring 140 maintains the rotatable member 135 frictionally in engagement with the opposite end of the housing to prevent accidental rotation with respect thereto.

The rotatable member 135 is provided with a ring of uniformly spaced index marks and the end of the housing is provided with similarly uniformly spaced numbered marks to give value to the index marks.

To operate the device, the user grasps the knob 135 between the thumb and index finger of the left hand so that the index mark opposite the amount he wishes to record is exposed toward him between these fingers. He then rotates the housing relative to the knob with his right hand so that the numbered marks pass the selected index mark in decreasing order until the mark corresponding to zero on the housing is disposed opposite the exposed index mark between his fingers. In so doing, he has rotated the screw sufficiently to shift the index member 133 relative the scale 132 an amount corresponding to the amount to be recorded.

In the illustrated embodiments of the invention, suitable indicia may be imprinted on the front face of the housing to identify the respective push buttons and the visible indicia on the various recording scales. If desired, this indicia may be imprinted on a strip that is readily attached to the front face of the housing by adhesive means or the housing may be provided with grooves or slots into which printed matter may be inserted. In this latter instance, the user has greater freedom in selecting the legends to be applied to the various scales to correspond, for example, to similar categories used in household budgeting.

It is obvious that most of the relatively rigid structural members of the calculating device can be made of many different metallic and non-metallic materials, but for ease of manufacturing with low cost, it is believed that plastic materials will be most suitable, particularly for the further reason that they are of light weight. The housing itself may be molded in one piece with a separable cover which may be either the front or back face, as desired. The tapes and belts may be of metal, plastic or fabric materials.

For the tubing used in the drive rod 45, the material sold under the trade name of "Tygon" has been found suitable. Similar material may be used for the rollers which carry the belts and tapes.

The actuating push buttons which project from the front face of the device as seen in FIGURE 1 may be constructed to project from the end of the housing to reduce the overall thickness of the device. In such case, push buttons could be provided with wedge-shaped cam portions or lever arrangements, acting upon the support means for the rollers, to actuate the rollers within the housing into engagement with the tubular drive rod 45.

The foregoing embodiments of this invention each illustrate calculators of extreme simplicity and low cost which are durable, portable and foolproof. These devices lend themselves to many useful applications in the home, in the office or by travellers. The operating and indicating devices of each are not readily susceptible to changes in the recorded readings during handling of the devices and the compactness of each of the embodiments has been unknown in any prior device that might have been useful for similar purposes.

While I have shown and described several embodiments in accordance with the present invention, it is understood that the same is not limited thereto but is susceptible of many changes and modifications within the spirit and scope of the present invention and I, therefore, do not wish to be limited to the particular embodiment illustrated herein but intend to cover all such changes and modifications as are encompassed by the scope of the appended claims.

I claim:

1. A readily portable mechanical calculating device comprising a housing, an actuating member rotatable on said housing, said actuating member having a series of exposed index marks and movable relative to said housing, means within said housing for totalizing the number of said marks corresponding to the relative movement of said member with respect to said housing including at least two relatively movable tapes having scaled numerical indicia thereon, connecting means operatively connecting one of said relatively movable tapes with said actuating member to provide therebetween a continuous drive connection operable to cause said one relatively movable tape to move in unison with and in proportion to said actuating member at all times upon movement of said actuating member, and individual selectively engageable connecting means for each of said other relatively movable tapes between said actuating member and each of said other relatively movable tapes for individually operatively connecting any one of said other tapes with said actuating member independently of one another to move each selectively actuated other tape upon movement of said actuating member simultaneously with the movement of said one tape.

2. A readily portable mechanical calculating device comprising a housing, an actuating member rotatable on said housing, said actuating member having a series of exposed index marks arranged in a circle and uniformly spaced thereon and repeatedly movable past a given point on said housing by repeated rotation of said member in one direction, said housing having, adjacent the marks on said member, uniformly numbered indicia decreasing numerically in a direction corresponding to said one direction, means within said housing for totalizing amounts corresponding to the number of said marks moved in said one direction past said given point on said housing, said totalizing means including two relatively movable indicating members having scaled indicia and an index, respectively, connecting means operatively connecting said rotatable member with one of said relatively movable indicating members to provide therebetween a continuous drive connection operable to cause said one relatively movable indicating member to move in unison with and in proportion to, but at a lesser rate than, the movement of said actuating member in said one direction, at least one other pair of relatively movable members for totalizing movement of said index marks past said given point during selected movements of said rotatable member, and means for selectively interconnecting one of the members of each of said other pair for actuation by said rotatable member during simultaneous movement of said first-mentioned one relatively movable indicating member.

3. A readily portable mechanical calculating device comprising a housing, an actuating member movable relative to said housing, said actuating member having a series of exposed index marks, means carried by said housing for totalizing the number of said marks corresponding to the relative movement of said actuating member with respect to said housing including at least two further relatively movable indicating members providing indications, by means of scaled indicia carried by the device, of certain movements of said actuating member, connecting means operatively connecting one of said further relatively movable members with said actuating member to provide therebetween a continuous drive connection operable to cause said one further relatively movable member to move in unison with and in proportion to said actuating member at all times upon movement of said actuating member, and selectively engageable connecting means operatively connecting said actuating member with any other of said further relatively movable members including individually operable means for each further relatively movable member for manually and selectively actuating at any time any others of said further relatively movable members independently of one another to move the same selectively upon movement of said actuating member, simultaneously with the movement of said one further relatively movable member, said actuating means moving each said other relatively movable member at a rate of movement less than the movement of said actuating member but greater than the movement of said one member of said relatively movable members.

4. A readily portable mechanical calculating device comprising a housing, an actuating member movable relative to said housing, said actuating member having a series of exposed index marks, means carried by said housing for totalizing the number of said marks corresponding to the relative movement of said actuating member with respect to said housing including at least two further relatively movable indicating members providing indications, by means of scaled indicia carried by the device, of certain movements of said actuating member, connecting means operatively connecting one of said further relatively movable members with said actuating member to provide therebetween a continuous drive connection operable to cause said one further relatively movable member to move in unison with and in proportion to said actuating member at all times upon movement of said actuating member, said selectively engageable connecting means operatively connecting said actuating member with any other of said further relatively movable members including individually operable means for each further relatively movable member for manually and selectively actuating at any time any others of said further relatively movable members independently of one another to move the same selectively upon movement of said actuating member, simultaneously with the movement of said one further relatively movable member, said means for selectively actuating each said other relatively movable member comprising a manually adjustable selector movable relative said housing to engage a driven connection between said other member and said actuating member, and means for biasing said manually adjustable member to a position in which said other member is disconnected from said actuating member.

5. A calculating device according to claim 4 wherein each said selector is a push button, said push buttons being mounted for movement along substantially parallel axes.

6. A calculating device according to claim 5, wherein a single resilient member engages a plurality of said push buttons to bias them to the disconnected positions.

7. A calculating device according to claim 2 wherein one of said relatively movable members is said housing and the other member is the index, and a window in said housing through which relative movement of said index is visible.

8. A calculating device according to claim 7 wherein said connecting means includes a threaded member extending parallel to said window and said index is a nonrotatable member engageable with the threads of said threaded member for moving the index along said window.

9. A readily portable mechanical calculating device comprising a housing, an actuating member movable relative to said housing, said actuating member having a series of exposed index marks, means carried by said housing for totalizing the number of said marks corresponding to the relative movement of said actuating member with respect to said housing including at least two further relatively movable indicating members providing indications, by means of scaled indicia carried by the device, of certain movements of said actuating member, connecting means operatively connecting one of said further relatively movable members with said actuating member to provide therebetween a continuous drive connection operable to cause said one further relatively movable member to move in unison with and in proportion to said actuating member at all times upon movement of said actuating member, and selectively engageable connecting means operatively connecting said actuating member with any other of said further relatively movable members including individually operable means for each further relatively movable member for manually and selectively actuating at any time any others of said further relatively movable members independently of one another to move the same selectively upon movement of said actuating member, simultaneously with the movement of said one further relatively movable member, said selectively engageable connecting means for selectively interconnecting the actuating member to each said other relatively movable member comprising a friction drive means.

10. A calculating device according to claim 9 wherein said friction drive means includes a common rotatable friction drive member, and an individual driven member selectively engageable with said common drive member for each said other relatively movable member.

11. A calculating device according to claim 10 comprising a manually-operable actuator including a button projecting from said housing for selectively engaging each of said driven members with said drive member.

12. A calculating device according to claim 11 wherein there is a resilient member for biasing each of said buttons to a disengaged position.

13. A readily portable mechanical calculating device comprising a housing, an actuating member movable relative to said housing, said actuating member having a series of exposed index marks, means carried by said housing for totalizing the number of said marks corresponding to the relative movement of said actuating member with respect to said housing including at least two further relatively movable indicating members providing indications, by means of scaled indicia carried by the device, of certain movements of said actuating member, connecting means operatively connecting one of said further relatively movable members with said actuating member to provide therebetween a continuous drive connection operable to cause said one further relatively movable member to move in unison with and in proportion to said actuating member at all times upon movement of said actuating member, and selectively engageable connecting means operatively connecting said actuating member with any other of said further relatively movable members including individually operable means for each further relatively movable member for manually and selectively actuating at any time any others of said further relatively movable members independently of one another to move the same selectively upon movement of said actuating member, simultaneously with the movement of said one further relatively movable member, each said further relatively movable member being a continuous tape, and a common rotatable drive member operatively connected between said actuating member and said continuous tapes, said common rotatable drive member being driven by said actuating member and being operable to drive said further relatively movable members independently of one another.

14. A calculating device according to claim 13 wherein each said tape is supported for movement by a pair of rollers.

15. A calculating device according to claim 14 wherein said selectively engageable connecting means includes an elongated roller driven by said actuating member and one of the rollers for each selectively actuatable tape is selectively engageable with said roller to be frictionally driven thereby to move the tape.

16. A calculating device according to claim 14 wherein a manually operable member is provided for one of the rollers for each selectively actuatable tape and the roller is displaceable by the manually-operable member and further comprising means driven by said actuating member and engaged with each roller that is displaced for driving the respective tape.

17. A calculating device according to claim 14 wherein the two rollers for each tape are spaced and said tapes are disposed in substantially parallel relationship with substantially coplanar portions extending between said rollers, said actuating member being rotatable about an axis substantially perpendicular to the plane of the coplanar portions of said tapes between said rollers.

18. A calculating device according to claim 15 comprising a belt extending between said actuating member and said elongated roller for driving the latter.

19. A calculating device according to claim 14 wherein at least one roller associated with each tape is biased relative to said housing and to the other roller to maintain said tape in tension.

20. A calculating device according to claim 16 wherein said manually-operable member is a button including means biasing it to a predetermined position relative said housing and displaceable from said position to selectively engage said displaceable roller with said means driven by said actuating member.

21. A calculating device according to claim 20 comprising resilient means connecting said displaceable roller and said button to maintain frictional engagement between the roller and the means driven by said rotatable member when the button is displaced and to permit lost motion movement of the button after said frictional engagement occurs.

22. A calculating device according to claim 21 wherein said resilient means is a metal spring projecting laterally from said button within the housing.

23. A calculating device according to claim 21 wherein said rsilient means is a lateral resilient plastic extension of said button.

24. A calculating device comprising a housing having a generally flat face at one side thereof, a rotatable disk at said flat face having an axis of rotation generally perpendicular to said face, a plurality of generally parallel belts having numerical indicia thereon and disposed within said housing, each said belt being a continuous loop, a pair of spaced rollers for each said belt supporting the latter for movement when at least one of said rollers is rotated, a common drive member rotatable within said housing and driven by said disk, said tapes being disposed with a portion thereof passing beneath said face, window means in said face of said housing for viewing a portion of each of said tapes, one of the rollers associated with each tape being frictionally engageable with said drive member within the housing to affect displacement of said tapes, a plurality of said last-mentioned rollers each including means for selectively engaging it with the drive member within the housing for selectively driving a respective tape, the roller for driving one of said tapes being continuously in engagement with said rotatable member and being driven concurrently with the drive of any of said selectively engageable rollers so that the tape associated therewith provides a total indication of the displacement of the selectively driven tapes, said rotatable disk having thereon a ring of uniformly spaced index marks, each of said index mark comprising a tool-engageable recess, a stationary numerical scale on said housing adjacent said marks for measuring the marks on said disk, a stop positioned adjacent the path of movement of said ring upon rotation of said disk to interfer with continuous rotation of said disk when one of said marks is engaged with a tool, and a plurality of push buttons projecting from said housing and connected with the rollers supporting said selectively drivable belts for effecting the selective drive by simultaneous depression of a button and rotation of said disk.

25. A readily portable mechanical calculating device comprising a housing, an actuating member movable relative to said housing, said actuating member having a series of exposed index marks, means carried by said housing for totalizing the number of said marks corresponding to the relative movement of said actuating member with respect to said housing including at least two further relatively movable indicating members providing indications, by means of scaled indicia carried by the device, of certain movements of said actuating member, connecting means operatively connecting one of said further relatively movable members with said actuating member to provide therebetween a continuous drive connection operable to cause said one further relatively movable member to move in unison with and in proportion to said actuating member at all times upon movement of said actuating member, and selectively engageable connecting means operatively connecting said actuating member with any other of said further relatively movable members including individually operable means for each further relatively movable member for manually and selectively actuating at any time any others of said further relatively movable members independently of one another to move the same selectively upon movement of said actuating member, simutaneously with the movement of said one further relatively movable member, said relatively movable indicating members being rotatable members, and gear reduction means for driving each of said rotatable members from said actuating member.

26. A calculating device according to claim 25, wherein said rotatable indicating members are discs carrying said scaled indicia for indicating amounts of movement of said actuating member, said gear means including members, and means for moving respective members of said gear means and the selectively movable indicating members into engagement for driving the latter by said actuating member.

References Cited by the Examiner

UNITED STATES PATENTS

| 209,644 | 11/1878 | Bill | 235—71 |
|---|---|---|---|
| 529,799 | 11/1894 | Martin | 235—71 |
| 1,084,632 | 1/1914 | Heuser | 235—91 |
| 1,271,927 | 7/1918 | Murchey | 235—11 |
| 1,478,384 | 12/1923 | Dorsch. | |
| 2,368,761 | 2/1945 | Hogan | 235—91 |
| 2,940,666 | 6/1960 | Newmark et al. | 235—91 |
| 2,973,144 | 2/1961 | Clyde et al. | 235—110 X |

RICHARD B. WILKINSON, *Primary Examiner.*

LEO SMILOW, LEYLAND M. MARTIN, *Examiners.*

M. I. POLLACK, M. P. HOFFMAN, C. M. OVERBEY,
*Assistant Examiners.*